March 30, 1943.  W. D. THOMPSON  2,315,284
MULTIPLE FILM CARRYING CAMERA
Filed May 13, 1940   2 Sheets-Sheet 1

Inventor
William D. Thompson
By Lyon & Lyon
Attorneys

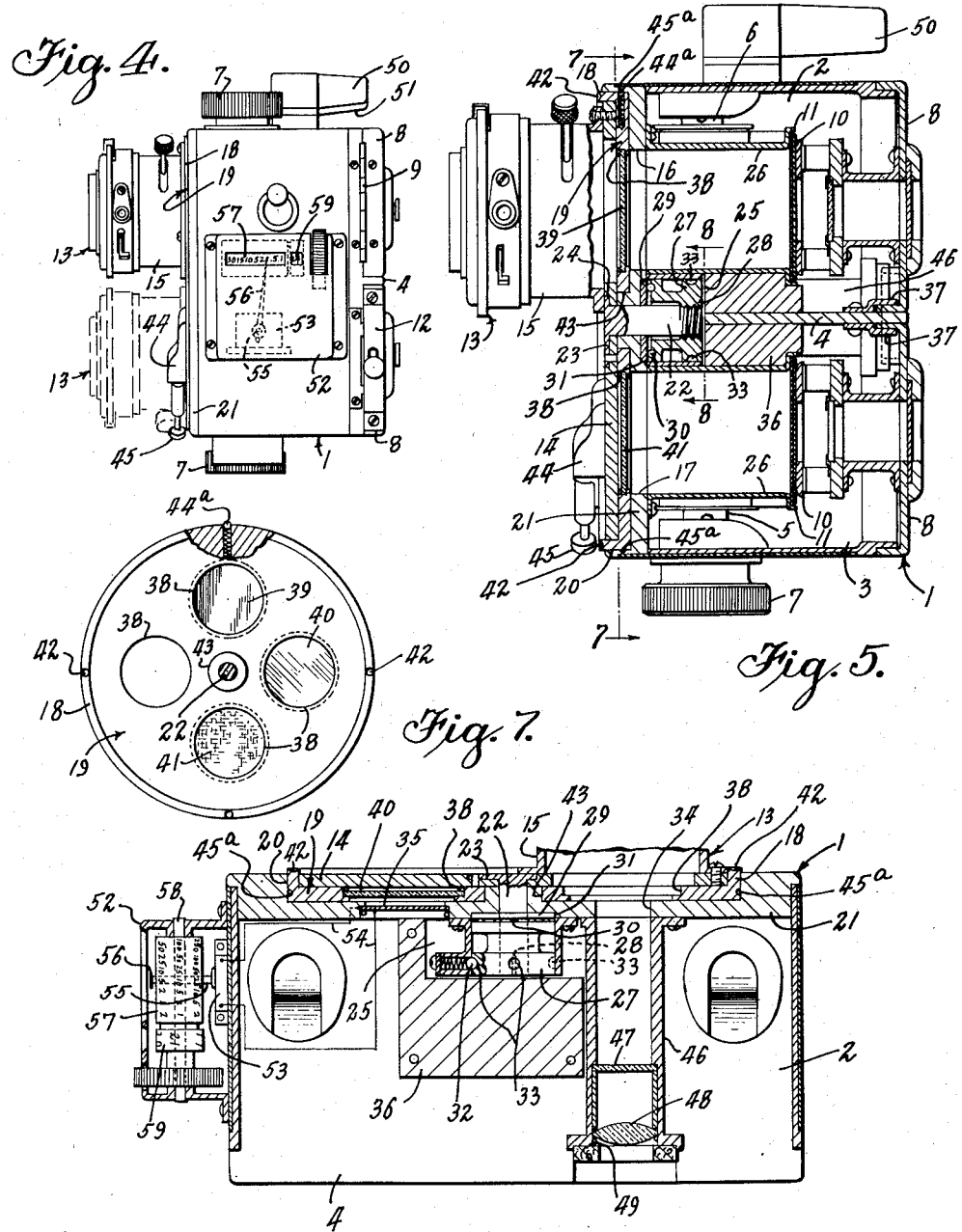

Patented Mar. 30, 1943

2,315,284

UNITED STATES PATENT OFFICE 2,315,284

MULTIPLE FILM CARRYING CAMERA

William D. Thompson, San Diego, Calif.

Application May 13, 1940, Serial No. 334,722

9 Claims. (Cl. 95—2)

This invention relates to cameras and more particularly to a multiple film carrying camera permitting the exposure of two films of similar or different character of the same scene at substantially the same time through a single lens system.

It is the object of my invention to provide a camera adapted to carry two films, one of which may be a color film and the other of which may be a black and white film and which camera has a lens mechanism mounted in the camera in such manner as to permit the same to be simply and easily moved to position required for exposure of either of the films through said single lens mechanism.

Another object of this invention is to provide a camera adapted for carrying multiple films and including a rotatable turret means including a lens and a filter system carrying a multiplicity of filters permitting exposure of either film through the lens system in conjunction with any one of the said filters as selected.

Other objects and advantages of this invention it is believed will be apparent from the following detailed description of a preferred embodiment thereof as illustrated in the accompanying drawings.

In the drawings:

Figure 4 is an edge elevation illustrating the lens turret as rotated to indicate the lens barrel in dotted lines in a second rotated position.

Figure 5 is a sectional edge elevation taken substantially on the line 5—5 of Figure 1.

Figure 6 is a sectional view taken substantially on the line 6—6 of Figure 2.

Figure 7 is a sectional view taken substantially on the line 7—7 of Figure 5 illustrating the filter disc.

Figure 1:
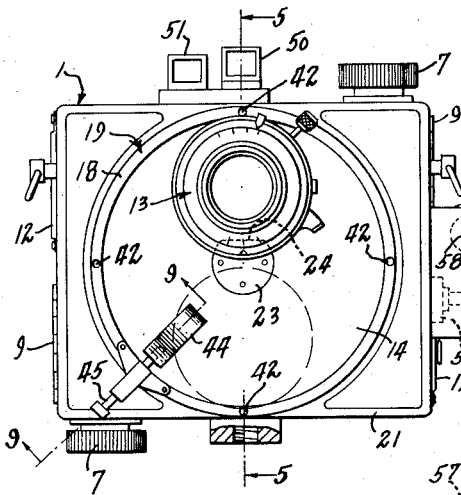
Figure 1 is a front elevation of the camera embodying my invention.
Figure 2:
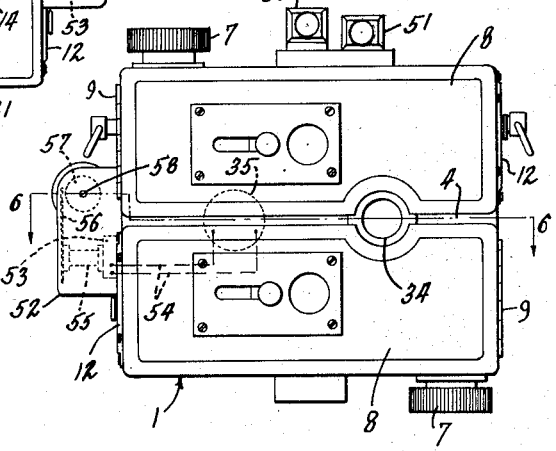
Figure 2 is a rear elevation thereof.
Figure 8:
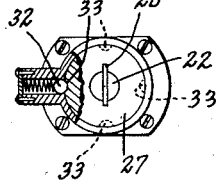
Figure 8 is a sectional view taken substantially on the line 8—8 of Figure 5.

In the preferred embodiment of my invention illustrated in the accompanying drawings, 1 indicates a camera box or case which may be of any suitable or desirable construction and which is generally rectangular in form and of a light-proof construction, as is well understood in this art. The camera box 1 is divided into two film-carrying compartments 2 and 3 by means of a dividing partition 4 which prevents the light when admitted into either of the chambers on exposure of the films carried therein from being transmitted into the other chamber. In each of the chambers 2 and 3 there is provided film reels 5 and 6 of any suitable or desirable construction upon which the film to be exposed is reeled.

Suitable reeling knobs 7 of any suitable or desirable construction as is well understood in the art provided for releasable connection with the reels 5 in order to wind the films upon the winding reels 5 to successively move portions of the films carried on the carrier reels 6 into position of exposure.

Doors or covers 8 are provided for individually closing the chambers 2 and 3 and, as herein indicated, the doors 8 may be hinged at 9 to the box 1. Each of the doors 8 may be provided with film pressure plates 10, as is well understood in the art for holding the films flat against the exposure frames or film guides 11 within the chambers 2 and 3.

The films carried in the chambers 2 and 3 may be like films or they may be films carrying different types of emulsions, as desired, it being particularly advantageous to mount in one of the chambers, for example, a negative film of the color type and to mount in the other chamber a negative film of the black and white type. It will be obvious that color type films may be mounted in both chambers, or black and white type films may be mounted in both chambers if desired, and in accordance with the photographic tests or exposures to be made.

Suitable latch means indicated at 12 are provided for latching the covers 8 on the box 1 when the said covers are rotated to close in closed position.

A lens system is provided through which the films carried in the compartments 2 and 3 are exposed. This lens system may include any suitable or desirable type of lenses, and this lens system 13 is carried on a turret lens disc 14 mounted upon the front of the camera box 1 in position to permit the lens system barrel 15 to be rotated over the lens box apertures 16 and 17, respectively. The turret lens disc 14 is mounted within the cylindrical flange 18 of the filter disc 19 and the filter disc 19 is mounted within the cylindrical guide 20 formed on the front plate or face plate 21 of the camera box 1. The assembly is held in position upon a shaft 22 which projects through the center of the filter disc 19 and lens disc 14. The shaft 22 has a head 23 which may be flattened as indicated at 24 to fit within a corresponding recess formed in the lens disc 14 so that the shaft 22 rotates with the lens disc.

Mounted within a turret recess 25 in the camera box 1 between the light tubes 26 is a turret nut 27 which is threaded to the shaft 22 and secured thereto by means of a keylock 28.

Interposed between the turret nut 27 and a bearing plate 29 are bearings 30 upon which the turret nut 27 rotates. The plate 29 is fitted within a recess 31 formed in the front plate 21.

Mounted within the recess 25 is a spring-urged ball 32 adapted to engage within any one of a plurality of detention recesses 33 formed in the turret nut 27 and positioned so as to position the lens barrel 15 with relation to the light apertures 16 and 17 and also with relation to the focusing aperture 34 formed through the camera box 1 between the chambers 2 and 3. A further detent 33 is formed to permit the lens barrel 15 to be retained in position over the light meter element 35 also mounted in the front plate 21.

Mounted between the light tubes 26 is a light sealing block 36 through which the partition 4 extends. The partition 4 formed in the box 1 carries light seal strips 37 to receive the flanges of the covers 3.

The filter disc 19 is provided with a multiplicity of radially spaced filter apertures 38 in three of which are positioned filters or filter screens 39, 40 and 41 which may be respectively red, green and yellow filters. The other aperture 38 is an open or unscreened aperture.

Figure 3:
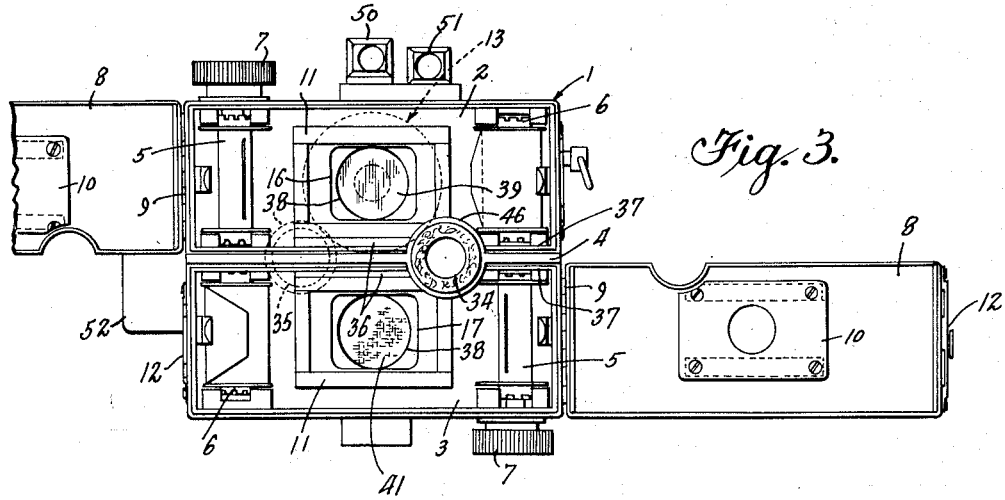
Figure 3 is a rear elevation with the rear covers swung to open position.
Figure 9:
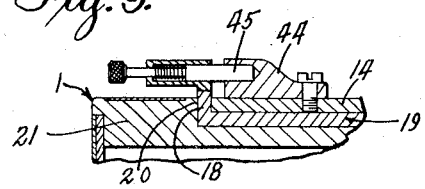
Figure 9 is a sectional view taken substantially on the line 9—9 of Figure 1.

Formed on the flange 20 are color indices 42 adjacent the respective apertures, indicating the color of the filters carried in the said apertures. The filter disc 19 is of course free to rotate around the hub section 43 of the front plate 21, and means are provided for releasably latching the filter disc to the lens turret 14. This latch means (Figure 3) includes latch detent element 44 carried on the front surface of the lens turret disc 14 and a spring-urged plunger 45 carried in the flange 20 of the filter disc 19.

Means are provided for releasably holding the filter disc 19 in adjusted position relative to the apertures of the plate 21 which includes a spring pressure ball 44a (Fig. 7) positioned to pass into detents 45a formed in spaced relation in the flange 20 of the plate 21.

The focusing aperture 34 is provided in the camera box 1 between the film chambers 2 and 3 and is provided with a viewing tube 46 which is secured to the front face of the front plate 21 and extends through the camera box 1. Mounted in the viewing tube 46 is a ground glass 47 which is positioned in the plane of the films positioned upon the exposure frames 11.

A lens 48 is mounted at the rear of the tube 46 and is held in position by means of a retainer 49. With the lens system rotated over this viewing aperture 34, direct vision of the scene to be photographed is permitted, thus enabling proper focusing with the color filter that is to be used, interposed between the lens assembly. Suitable view finders 50 and 51 are also carried by the camera box 1 and are positioned with relation to the lens system when the same is rotated to position over the apertures 16 and 17, respectively.

Carried by the box 1 is a light meter 52 which may be of any suitable design or construction and is operatively connected with the light meter element 35. The construction of the light meter as illustrated is of the type including an actuating element 53 which is electrically connected as indicated at 54 with the element 35. The operating means 53 actuates a shaft 55 upon which there is carried a pointer 56. A scale drum 57 is carried upon a shaft 58 in association with the pointer 56. Mounted also on the shaft 58 in conjunction with the drum 57 is a scale 59 indicating film emulsion speeds so that the drum may be rotated to position the proper exposure speed scale with reference to the pointer 56, dependent upon the type of film being utilized.

In order that the light meter may indicate directly the light transmitted through the lens system from any particular scene, the lens turret may be rotated to position the lens system 13 directly over the element 35. When filters are employed in connection with the particular exposure to be made, the proper filter may also be rotated to position between the lens system and the element 35.

In taking a picture with this camera, the focusing is accomplished by looking through the lens assembly while any desired screen, for example, a color screen is interposed between the eye of the photographer and the lens assembly, and hence the photographer can adjust the lens assembly to an exact focus, and there is no possibility, as would otherwise occur, of disturbing a focused relation by the interposition of a color screen after the focusing has been accomplished.

Having fully described my invention, it is to be understood that I do not wish to be limited to the details herein set forth, but my invention is of the full scope of the appended claims.

I claim:

1. A camera including a box, a partition dividing the box into two separated film-carrying chambers having separated exposure apertures, means for supporting and guiding a separate film in each of said chambers, a lens turret, a lens system mounted on the turret, means for rotatably supporting the lens turret to permit the lens system to be selectively moved to position with relation to the exposure apertures, a filter disc having a plurality of apertures interposed between the turret and the exposure apertures, a focusing aperture formed through the box means for rotatably supporting the filter disc, filters carried by the filter disc whereby the filter may be selectively interposed in the focusing aperture while focusing, and thereafter interposed between the lens system and the exposure aperture when the exposure is to be made on one of the films.

2. A camera including a camera box, means dividing the camera box into separated film-carrying chambers, means for supporting and guiding a separate film in each of said chambers, each of said chambers having its individual exposure aperture, a lens system, means for movably supporting the lens system whereby the same may be moved to position with relation to either of the exposure apertures, a filter-carrying means interposed between the lens system and the exposure apertures, said filter-carrying means having a plurality of apertures, some of which carry colored filters, and means for movably supporting the filter-carrying means whereby any of said filter apertures may be moved to a position aligned between the lens system and either of said exposure apertures.

3. In a camera, the combination of a case, means for supporting a plurality of independent films in the case, film-guides for the different films located equidistant from a central axis, a face plate for the case, a filter disc before the face plate and mounted for rotation on said axis, a plurality of filter screens carried on the filter disc on a radius enabling any one of the same to register individually with said film-guides, a lens-disc rotatably mounted on the said axis and located on the outer side of the filter disc, a lens barrel carried by the said lens-disc projecting forward from the same, located on a radius from said axis to enable the lens barrel to be aligned with any one of the said film-guides, means for holding the filter disc in a plurality of different oriented positions with any one of the filters in alignment with any one of the said film-guides, and means operatable at will for latching the lens-disc to the filter disc to enable rotation of the lens-disc on said axis to be imparted to the filter disc.

4. In a camera, the combination of a case, means for supporting a plurality of independent films in the case, film-guides for the different films located equidistant from a central axis, a face plate for the case, a filter disc before the face plate and mounted for rotation on said axis, a plurality of filter screens carried by the filter disc on a radius enabling any one of the same to register individually with the said film-guides, a light meter element carried in the face plate, said filter disc having an unscreened aperture on a radius from said axis enabling the same to be positioned to register with said light meter element, a lens-disc mounted before said filter disc and rotatable on the said axis, and a lens barrel carried by the lens-disc and located on a radius enabling the same to be positioned to register with the light meter element and the said unscreened aperture to enable light to impinge upon the light meter element through the lenses in the lens barrel for measuring the degree of illumination before making an exposure.

5. In a camera, the combination of a case, means for supporting a plurality of independent films in the case, film-guides for the different films located equidistant from a central axis, a face plate for the case, a disc before the face plate mounted for rotation on said axis, a light meter element carried by the face plate at the same distance from the axis as said film-guides, said disc having an aperture therethrough on a radius from said axis that enables the same to be positioned to register with said light meter element, a lens-disc mounted before said first-named disc and rotatable on the said axis, a lens barrel carried by the lens-disc and located on a radius enabling the same to be positioned to register with the registering light meter element and the said aperture, to enable the light to impinge upon the light meter through the lenses of the lens barrel for measuring the degree of illumination before making an exposure.

6. In a camera, the combination of a case, means for supporting a plurality of independent films in the case, film-guides for the different films located equidistant from a central axis, a face plate for the case, a disc before the face plate mounted for rotation on said axis, a light meter element carried by the face plate at the same distance from the axis as said film-guides, said disc having an aperture therethrough on a radius from said axis that enables the same to be positioned to register with said light meter element, a lens-disc mounted before said first-named disc and rotatable on the said axis, a lens barrel carried by the lens-disc and located on a radius enabling the same to be positioned to register with the registering light meter element and the said aperture, to enable the light to impinge upon the light meter through the lenses of the lens barrel for measuring the degree of illumination before making an exposure, means for yieldingly holding the first-named disc in a position to maintain the said aperture in register with the light meter element, and means operatable at will to latch the lens-disc to the first-named disc to enable rotation of the lens-disc to be imparted to the first-named disc.

7. In a camera, the combination of a case, means for supporting a plurality of independent films in the case, film-guides for the different films located equidistant from a central axis, a face plate for the case, a rotatable filter disc countersunk into the outer face of the face plate and having a plurality of filter screens spaced circumferentially about the said axis and located at a radius enabling the same to be aligned with any one of the said film-guides, a lens-disc countersunk into the outer side of the filter disc and rotatable on the said axis, a lens barrel carried by the said lens-disc and located on a radius from said axis enabling the lens barrel to be aligned with any one of the said film-guides, means for yieldingly holding the filter disc in a plurality of different positions with any one of the filter screens in alignment with any one of the said film-guides, and means operatable at will for latching the lens-disc to the filter disc so as to enable rotation of the lens-disc to be imparted to the filter disc.

8. In a camera, the combination of a case, a partition dividing the interior of the case into compartments, a face plate at the front of the case, a light tube in each of the compartments supported on the face plate, means for mounting a film in each compartment and for guiding the same across the axis of its corresponding light tube, a filter disc rotatably mounted on an axis substantially in the plane of the partition, said light tubes being located equidistant from the said axis, a lens-disc also mounted to rotate on the said axis outside of the filter disc, a lens barrel carried thereby capable of aligning with said light tubes individually, means for yieldingly holding the filter disc in different oriented positions so that any one of the filters carried thereby may register with any one of the light tubes, and means operatable at will to latch the lens disc to the filter disc.

9. In a camera, the combination of a case, a partition wall dividing the same into two compartments, an independent film mounted in each compartment, a guiding means for each film, a face plate, a viewing tube attached to the inner face of the face plate and located with its axis substantially in the plane of the partition wall, a light-meter element also located substantially in line with the partition wall, said film-guides, said viewing tube, and said light-meter element, being located at substantially equal distances from a central axis, a filter-disc rotatably mounted on the said axis on the outer side of the face plate; filter screens carried thereby, and an aperture formed therein, all on a radius enabling any one of the same to be positioned over the viewing tube and enabling the said aperture to be positioned over the light-meter element; a lens-disc on the outer side of the filter-disc, a lens-barrel carried thereby on a radius enabling the same to be positioned to register with the viewing tube for focusing on the object to be photographed, and capable of being positioned in register with the registering light-meter element and the said aperture so that the light impinging on the light-meter element passes through the lenses of the lens-barrel.

WILLIAM D. THOMPSON.